US012633509B2

(12) United States Patent
Matsushita et al.

(10) Patent No.: US 12,633,509 B2
(45) Date of Patent: May 19, 2026

(54) MASS SPECTROMETER

(71) Applicant: SHIMADZU CORPORATION, Kyoto (JP)

(72) Inventors: Tomoyoshi Matsushita, Kyoto (JP); Shunki Shiba, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 417 days.

(21) Appl. No.: 18/290,295

(22) PCT Filed: Mar. 4, 2022

(86) PCT No.: PCT/JP2022/009356
§ 371 (c)(1),
(2) Date: Nov. 11, 2023

(87) PCT Pub. No.: WO2022/249624
PCT Pub. Date: Dec. 1, 2022

(65) Prior Publication Data
US 2024/0274427 A1 Aug. 15, 2024

(30) Foreign Application Priority Data
May 26, 2021 (JP) ................................ 2021-088208

(51) Int. Cl.
*H01J 49/04* (2006.01)
*H01J 49/24* (2006.01)

(52) U.S. Cl.
CPC .......... *H01J 49/0422* (2013.01); *H01J 49/24* (2013.01)

(58) Field of Classification Search
CPC ........ H01J 49/00; H01J 49/02; H01J 49/0422; H01J 49/24; H01J 49/107; H01J 49/0409; H01J 49/26
(Continued)

(56) References Cited

U.S. PATENT DOCUMENTS 5,298,743 A 3/1994 Kato
6,483,108 B1 * 11/2002 Sakairi ................ H01J 49/0468 250/288
(Continued)

FOREIGN PATENT DOCUMENTS

JP 2004-127709 A 4/2004
JP 2015195112 A 11/2015

OTHER PUBLICATIONS

Extended European Search Report for corresponding European Application No. 22810905.4, issued May 14, 2025.
(Continued)

*Primary Examiner* — Jason L McCormack
(74) *Attorney, Agent, or Firm* — Renner, Otto, Boisselle & Sklar, LLP

(57) ABSTRACT

A mass spectrometer includes a housing, which has a wall and is provided with a mass spectrometry portion, a base portion, a sampling unit removably attached to the base portion, and an exhaust path for discharging gas derived from a sample. The exhaust path includes a first path provided in the sampling unit, a second path provided in the base portion, and a third path provided in the housing. The base portion has a first base portion fixed to the wall and a second base portion with the second path provided therein. The second base portion is removably fixed to the first base portion.

5 Claims, 10 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 2004/0195499 | A1* | 10/2004 | Ishikawa ............... | H01J 49/004 250/281 |
| 2006/0186334 | A1 | 8/2006 | Jolliffe et al. | |

OTHER PUBLICATIONS

International Search Report for corresponding Application No. PCT/JP2022/009356, mailed May 10, 2022.
Written Opinion of the International Searching Authority for corresponding Application No. PCT/JP2022/009356, mailed May 10, 2022, with English Machine Translation.

* cited by examiner

MASS SPECTROMETER

TECHNICAL FIELD

The present invention relates to a mass spectrometer.

BACKGROUND ART

In a mass spectrometer, generally, a sample is introduced into plasma of an ion source to be ionized, and the ionized sample is introduced through a sampling portion into a mass spectrometry portion. On the other hand, argon gas used for plasma formation and gas derived from the sample not introduced into the mass spectrometry portion flow through an exhaust path to be discharged from the sampling portion to a rotary pump that is a back pump.

Japanese Patent Laying-Open No. 2004-127709 (PTL 1) discloses a conventional mass spectrometer that analyzes a liquid sample together with a liquid chromatograph.

CITATION LIST

Patent Literature

PTL 1: Japanese Patent Laying-Open No. 2004-127709

SUMMARY OF INVENTION

Technical Problem

When the liquid sample is analyzed also with the use of the liquid chromatograph as disclosed in PTL 1, ammonium phosphate may be used as a mobile phase (solvent). Gas derived from ammonium phosphate may deteriorate parts of the exhaust path due to its corrosiveness. In addition, the gas may liquefy to be deposited as a sticky liquid substance in the exhaust path to the mass spectrometry portion or parts around the exhaust path.

The present invention has been made in view of the above problems. An object of the present invention is to provide a mass spectrometer that enables easy maintenance of parts of paths, which run from a sampling portion to a housing provided with a mass spectrometry portion, of an exhaust path for discharging gas from the sampling portion.

Solution to Problem

A mass spectrometer according to the present disclosure includes: a housing having a wall and being provided with a mass spectrometry portion; a base portion provided on the wall; a sampling unit removably attached to the base portion, the sampling unit forming a sampling portion for introducing a sample ionized into the mass spectrometry portion; and an exhaust path for discharging gas derived from the sample not introduced from the sampling portion into the mass spectrometry portion. The exhaust path includes a first path provided in the sampling unit, a second path provided in the base portion, the second path being in communication with the first path, and a third path provided in the housing, the third path being in communication with the second path. The base portion has a first base portion fixed to the wall, and a second base portion with the second path provided therein, the second base portion being removably fixed to the first base portion.

The above configuration enables easy maintenance of parts of the first path and the second path of the exhaust path, which run from the sampling portion to the housing provided with the mass spectrometry portion, by removing the sampling unit from the base portion and further removing the second base portion from the first base portion.

Advantageous Effects of Invention

The present invention can provide a mass spectrometer that enables easy maintenance of parts of paths, which run from a sampling portion to a housing provided with a mass spectrometry portion, of an exhaust path for discharging gas from the sampling portion.

DESCRIPTION OF EMBODIMENTS

Figure 1:
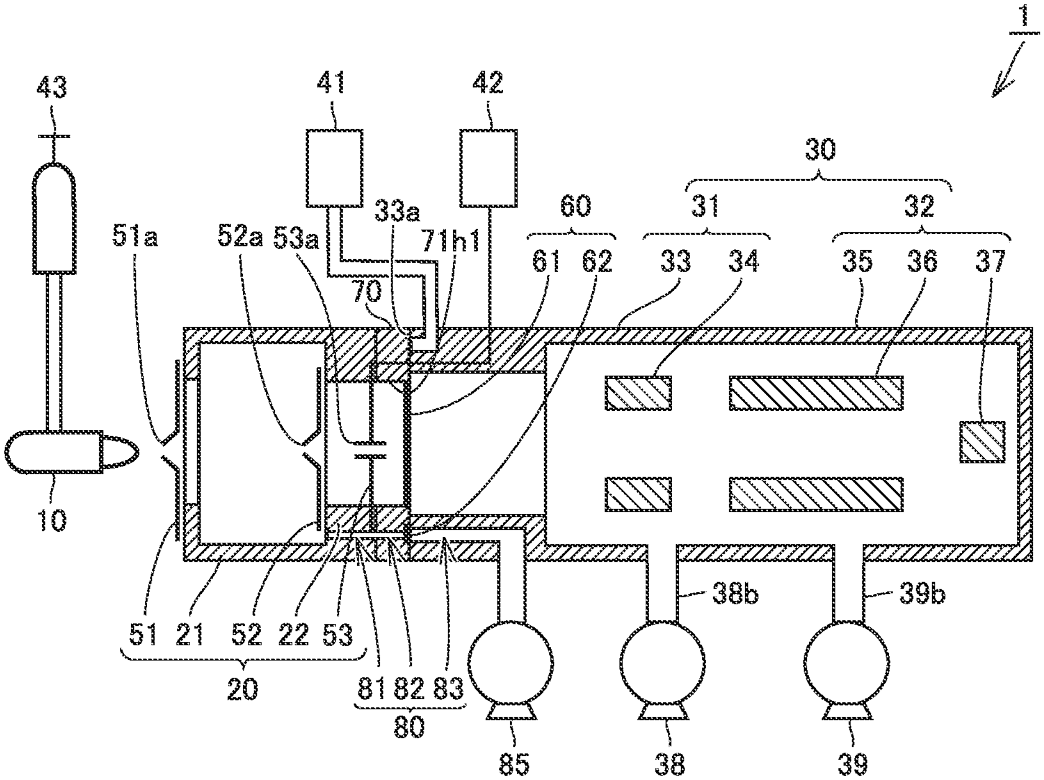
FIG. 1 is a schematic diagram of a mass spectrometer according to an embodiment.

An embodiment of the present invention will be described below in detail with reference to the drawings. The same or corresponding parts in the drawings are denoted by the same reference numerals in the embodiments below, and descriptions thereof will not be repeated.

Figure 2:
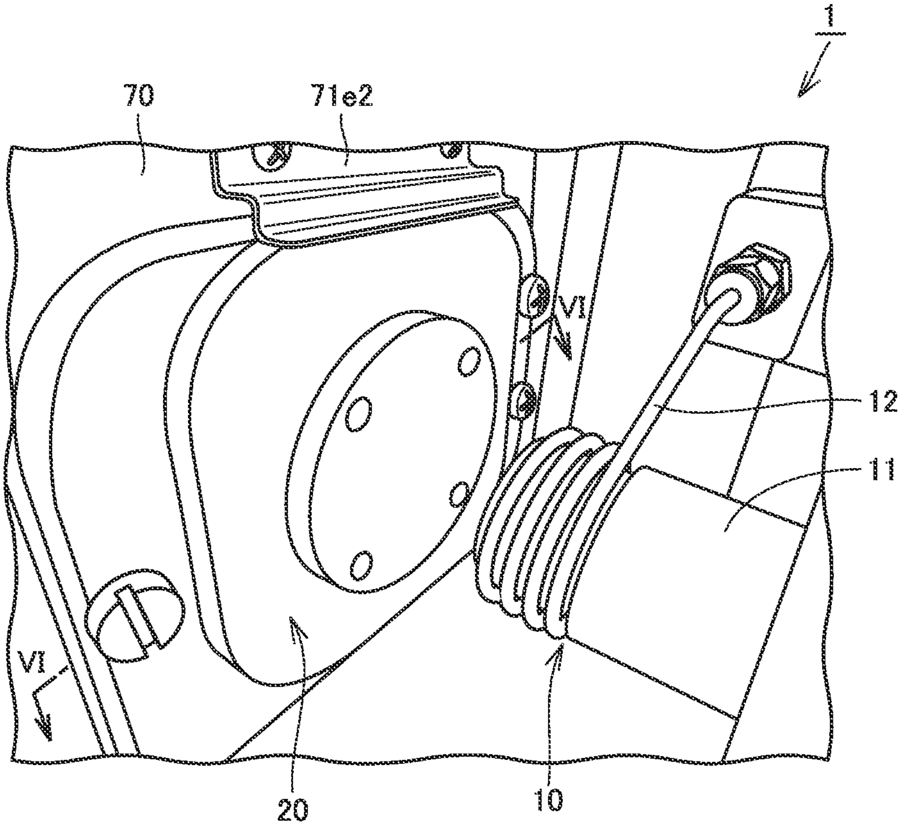
FIG. 2 shows a structure of a sampling portion of the mass spectrometer and therearound according to the embodiment.

FIG. 1 is a schematic diagram of a mass spectrometer according to an embodiment. FIG. 2 shows a structure of a sampling portion of the mass spectrometer and therearound according to the embodiment. A mass spectrometer 1 according to the embodiment will be described with reference to FIGS. 1 and 2.

As shown in FIG. 1, mass spectrometer 1 according to Embodiment 1 includes a plasma torch 10 serving as a plasma ion source, a sampling unit 20, a mass spectrometry portion 30, a shutter mechanism 60, a base portion 70, an exhaust path 80, vacuum pumps 38, 39, a refrigerant supply portion 41, a power supply 42, and a gas supply 43.

As shown in FIGS. 1 and 2, plasma torch 10 includes a sample gas tube (not shown), a plasma gas tube (not shown), a coolant gas tube 11, a high-frequency induction coil 12, and a gas inlet (not shown).

The sample gas tube has a cylindrical shape and is made of glass. The plasma gas tube covers the outer circumferential surface of the sample gas tube with an interval in between. The plasma gas tube has a cylindrical shape and is made of glass. Coolant gas tube 11 covers the outer circumferential surface of the plasma gas tube with an interval in between. Coolant gas tube 11 has a cylindrical shape and is made of glass. High-frequency induction coil 12 is wound around a tip of the outer circumferential surface of coolant gas tube 11. The gas inlet is connected to gas supply 43 and is supplied with argon gas or the like.

Sampling unit 20 is arranged to face plasma torch 10. Sampling unit 20 is removably attached to base portion 70. Sampling unit 20 has a refrigerant flow path for flowing refrigerant, such as a coolant, therethrough. The refrigerant flow path is supplied with refrigerant from refrigerant supply portion 41.

Sampling unit 20 includes a first plate-shaped body 21 and a second plate-shaped body 22 that constitute a housing of the unit. Sampling unit 20 also includes a sampling cone 51, a skimmer cone 52, and an extractor electrode 53. Sampling cone 51, skimmer cone 52, and extractor electrode 53 are arranged in the stated order in the direction from plasma torch 10 toward mass spectrometry portion 30. Sampling cone 51, skimmer cone 52, and extractor electrode 53 will be described below in detail with reference to FIGS. 3 and 4.

Base portion 70 is provided on a wall 33*a* of a housing 33, which will be described below. Base portion 70 is a portion for attaching sampling unit 20. Base portion 70 has an approximately plate shape. Base portion 70 will be described below in detail with reference to FIG. 5.

Mass spectrometry portion 30 includes a first chamber 31 and a second chamber 32. First chamber 31 includes housing 33 and an ion lens 34. For example, housing 33 is made of a metallic material such as aluminum. Housing 33 has wall 33*a* facing plasma torch 10. Ion lens 34 such as a converging lens is housed in housing 33.

Second chamber 32 is arranged adjacent to first chamber 31. Second chamber 32 is located forward of first chamber 31 in an ion travel direction. The ion travel direction is parallel to a direction in which plasma torch 10 and sampling unit 20 are arranged in the stated order.

Second chamber 32 includes a housing 35, a mass separator 36, and a detector 37. Housing 35 is provided to be contiguous to housing 33. For example, housing 35 is made of a metallic material such as aluminum. Within housing 35, mass separator 36 and detector 37 are arranged in order in the ion travel direction. Mass separator 36 has, for example, a quadrupole rod structure. Detector 37 includes an electron multiplier or the like.

The inside of housing 33 described above is connected to vacuum pump 38 via a high-vacuum exhaust path 38*b*. Vacuum pump 38 is, for example, a turbo-molecular pump. Driving vacuum pump 38 can produce a high vacuum in housing 33. The inside of housing 33 can be set to, for example, 0.1 Pa.

The inside of housing 35 described above is connected to vacuum pump 39 via a high-vacuum exhaust path 39*b*. Vacuum pump 39 is, for example, a turbo-molecular pump. Driving vacuum pump 39 can produce a high vacuum in housing 35. The inside of housing 35 can be set to, for example, 10-4 Pa.

Shutter mechanism 60 includes a first shutter 61 and a second shutter 62. First shutter 61 is provided so as to block a path through which an opening 71*h*1 provided in base portion 70 is in communication with the inside of housing 33. First shutter 61 switches between the state in which opening 71*h*1 and housing 33 are in communication with each other and the state in which they are not in communication with each other. Second shutter 62 is provided so as to switch between the state in which a second path 82 and a third path 83 of exhaust path 80, which will be described below, are in communication with each other and the state in which they are not in communication with each other. Shutter mechanism 60 will be described below in detail with reference to FIGS. 7 and 8.

Mass spectrometer 1 generates plasma by flowing a high-frequency current through high-frequency induction coil 12 of plasma torch 10, and ionizes a sample by the high heat of the plasma. The ionized sample (ions) and the plasma are introduced into sampling unit 20 through an opening 51*a* of sampling cone 51. The ions introduced into sampling unit 20 is introduced into housing 33 through an opening 52*a* of skimmer cone 52 and a cylindrical portion 53*a* of extractor electrode 53.

The ions introduced into housing 33 are caused to converge by ion lens 34 toward second chamber 32 located on the rear side in the travel direction. A voltage obtained by superimposition of a DC voltage and a high-frequency voltage is applied to mass separator 36, and only ions having a mass number (mass (m)/electric charge (z)) corresponding to the applied voltage selectively pass through mass separator 36. By manipulating a voltage to be applied as described above, an ion strength signal can be detected by detector 37 for ions having a prescribed mass number.

Exhaust path 80 is a flow path for discharging gas derived from the sample which has not been introduced from the sampling portion (sampling unit 20) into mass spectrometry portion 30. Exhaust path 80 leads to vacuum pump 85. Vacuum pump 85 is, for example, a rotary pump. Driving vacuum pump 85 can produce a low vacuum of approximately 100 to 150 Pa within sampling unit 20.

Exhaust path 80 includes a first path 81, second path 82, and third path 83. First path 81, second path 82, and third path 83 are in communication with each other in the stated order.

First path 81 is provided in sampling unit 20. Second path 82 is provided in base portion 70. Second path 82 is in communication with first path 81. Third path 83 is provided in housing 33. Third path 83 is in communication with second path 82 at one end and is in communication with vacuum pump 85 at the other end.

The gas derived from the sample generated in ionization of the sample is discharged through exhaust path 80 by driving vacuum pump 85.

Figure 3:
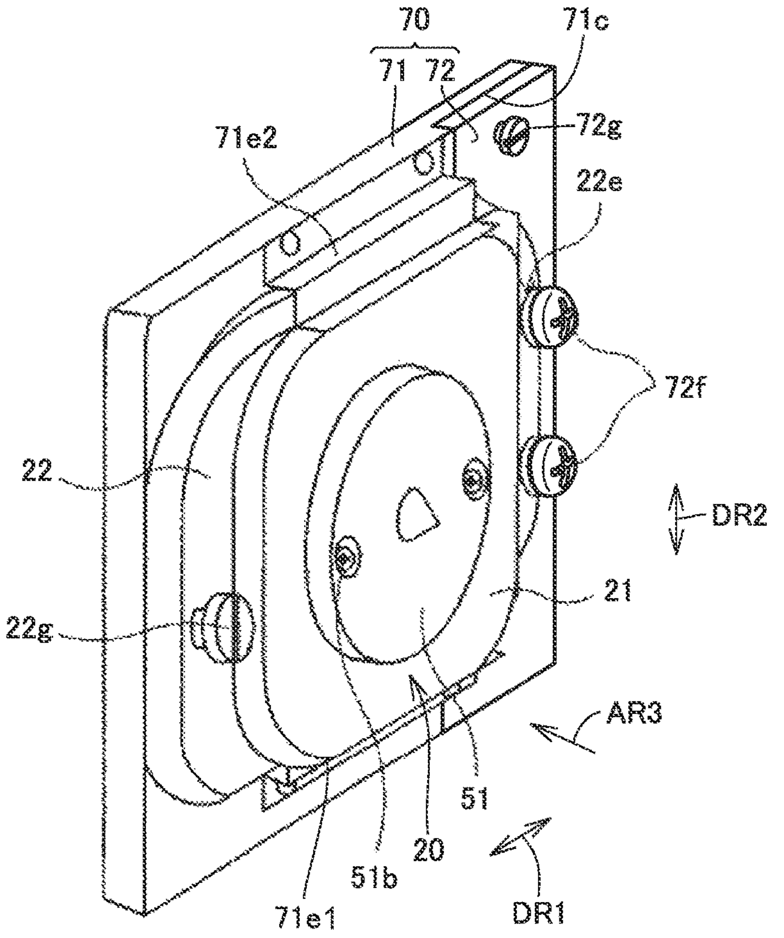
FIG. 3 is a perspective view of a base portion and a sampling unit according to the embodiment.
Figure 4:
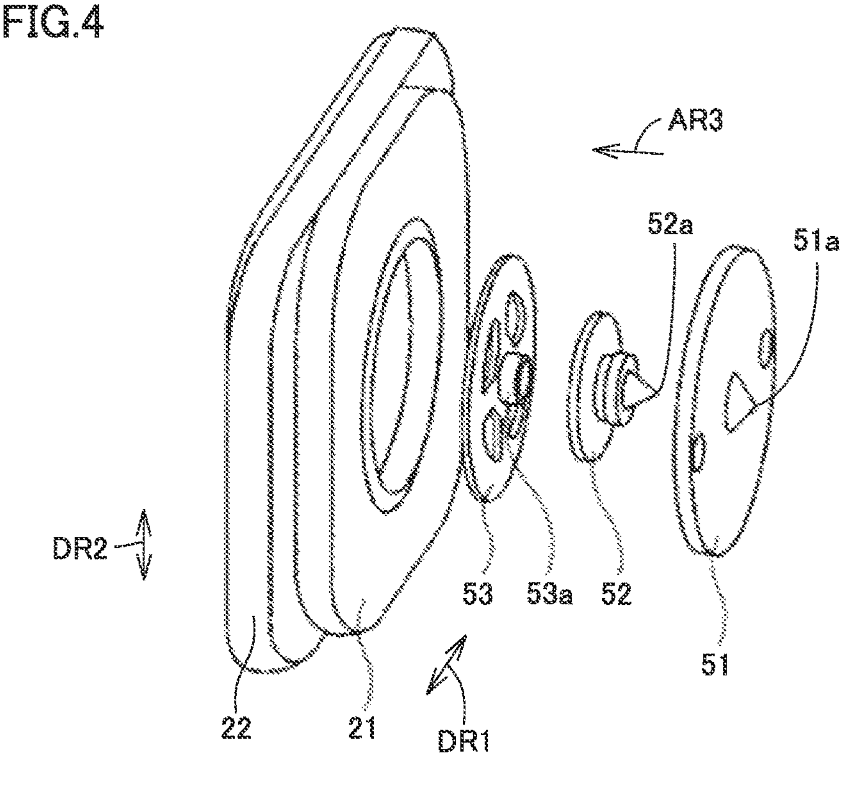
FIG. 4 is an exploded perspective view of the sampling unit according to the embodiment.
Figure 5:
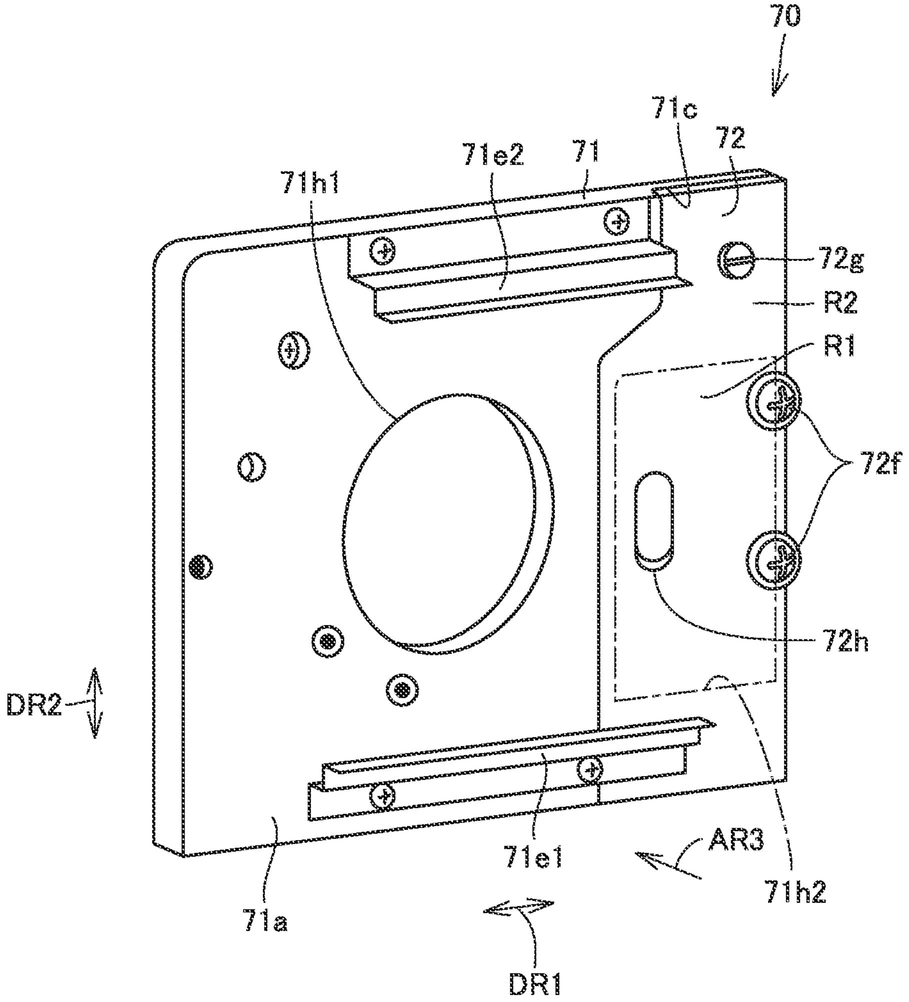
FIG. 5 is a perspective view of the base portion according to the embodiment.

FIG. 3 is a perspective view of the base portion and the sampling unit according to the embodiment. FIG. 4 is an exploded perspective view of the sampling unit according to the embodiment. FIG. 5 is a perspective view of the base portion according to the embodiment. Sampling unit 20 and base portion 70 will be described with reference to FIGS. 3 and 5.

As shown in FIGS. 3 and 4, sampling unit 20 includes first plate-shaped body 21, second plate-shaped body 22, sampling cone 51, skimmer cone 52, and extractor electrode 53, as described above. First plate-shaped body 21 is fixed to second plate-shaped body 22 with a fastening member (not shown) such as a screw.

Sampling cone 51 is a metallic body including a disc and a conical portion formed at the center of the disc. Opening 51*a* is formed at the center of the conical portion. Opening 51*a* has a diameter that gradually increases in the ion travel direction. For example, sampling cone 51 is removably fixed to first plate-shaped body 21 with fastening member 51*b* such as a screw.

Skimmer cone 52 is a metallic body including a disc and a conical portion formed at the center of the disc. The disc of the skimmer cone is smaller than the disc of sampling cone 51. Opening 52*a* of circular shape is formed at the center of the disc. Opening 52*a* has a diameter that gradually increases in the ion travel direction. For example, skimmer cone 52 is removably fixed to the front surface side of second plate-shaped body 22 with the fastening member (not shown) such as a screw. The front surface of second plate-shaped body 22 is a main surface located on the first plate-shaped body 21 side, which is a surface facing the plasma torch 10 side.

Extractor electrode 53 is a metallic body including a disc and cylindrical portion 53*a* formed at the center of the disc. Extractor electrode 53 is connected to power supply 42 (see FIG. 1), and a voltage of approximately 0 to 700 V is applied to extractor electrode 53. Extractor electrode 53 is removably fixed to the rear surface side of second plate-shaped body 22 with the fastening member (not shown) such as a screw. The rear surface of second plate-shaped body 22 is a main surface opposite to the side on which first plate-shaped body 21 is located, and is a surface facing the wall 33*a* side of housing 33.

As shown in FIGS. 3 and 5, base portion 70 includes a first base portion 71 and a second base portion 72.

First base portion 71 and second base portion 72 are arranged side by side in a first direction (DR1 direction) as viewed from a direction (an arrow direction AR3) perpendicular to wall 33*a*. The direction perpendicular to wall 33*a* refers to a direction parallel to the direction in which plasma torch 10 and sampling unit 20 face each other.

First base portion 71 has an approximately plate shape. First base portion 71 has opening 71*h*1, a first holding portion 71*e*1, a second holding portion 71*e*2, and a recess 71*c*. Opening 71*h*1 is provided approximately at the center of first base portion 71. Recess 71*c* is provided on one side in the first direction. Recess 71*c* has an opening 71*h*2 passing therethrough in a thickness direction (direction AR3). Second base portion 72 is removably attached to recess 71*c*.

First holding portion 71*e*1 and second holding portion 71*e*2 mainly serve to hold sampling unit 20. First holding portion 71*e*1 and second holding portion 71*e*2 also have a function to guide sampling unit 20 when sampling unit 20 is attached to, or removed from, base portion 70. First holding portion 71*e*1 and second holding portion 71*e*2 also serve as a positioning portion that positions sampling unit 20 in a second direction.

First holding portion 71*e*1 and second holding portion 71*e*2 are provided to extend in the first direction. First holding portion 71*e*1 and second holding portion 71*e*2 are arranged side by side in the second direction orthogonal to the first direction. The second direction is, for example, a direction parallel to an up-down direction (vertical direction).

First holding portion 71*e*1 is arranged on one end side of first base portion 71 in the second direction. First holding portion 71*e*1 is provided so as to engage with one end (lower end) of sampling unit 20 in the second direction.

First holding portion 71*e*1 is provided to extend to the second base portion 72 side as viewed from direction AR3. First holding portion 71*e*1 is provided to include a part that overlaps second base portion 72 as viewed from direction AR3. First holding portion 71*e*1 is provided so as to hold an end of second base portion 72 on one side in the second direction. Specifically, first holding portion 71*e*1 holds one end (lower end) of second base portion 72 by pressing second base portion 72 toward wall 33*a*.

Second holding portion 71*e*2 is arranged on the other end side of first base portion 71 in the second direction. Second holding portion 71*e*2 is provided so as to engage with the other end (upper end) of sampling unit 20 in the second direction. Second holding portion 71*e*2 is provided so as not to overlap second base portion 72 as viewed from direction AR3.

Second base portion 72 has an approximately plate shape. Second base portion 72 is located on one side in the first direction as viewed from direction AR3. Second base portion 72 is arranged to be flush with a main surface 71*a* of first base portion 71 which is exposed from second base portion 72, as viewed from direction AR3.

Second base portion 72 includes a first part R1 and a second part R2. First part R1 is fitted into opening 71*h*2 provided in first base portion 71. First part R1 has opening 72*h* passing therethrough in the thickness direction (direction AR3). Opening 72*h* defines second path 82 described above.

First part R1 is provided with a positioning portion 72*f*. An end of sampling unit 20 located on one side in the first direction is butted against positioning portion 72*f*. Thus, positioning portion 72*f* determines a position of sampling unit 20 in the first direction. Positioning portion 72*f* is provided to project from a surface of second base portion 72 perpendicularly to the surface. Positioning portion 72*f* is formed of a screw or the like attached to the front surface of second base portion 72.

For example, second part R2 is provided to be located around first part R1. Second part R2 overlaps first base portion 71 in direction AR3. Second part R2 functions as an overlapping portion partially overlapping first base portion 71.

Second part R2 is removably fixed to first base portion 71 with one or more fastening members (first fastening members) 72*g*. In the present embodiment, a single fastening member 72*g* is provided, so that second base portion 72 can be easily attached to, and removed from, first base portion 71.

Specifically, in attachment of second base portion 72 to first base portion 71, the lower end of second base portion 72 is inserted into a gap between first holding portion 71*e*1 and recess 71*c* of first base portion 71, and second part R2 is fitted into opening 71*h*2. Subsequently, the upper end side of second base portion 72 is fixed to recess 71*c* with fastening member 22*g*.

In fixing of sampling unit 20 to base portion 70, one end side of sampling unit 20 located on one side in the first direction is inserted, toward the one side in the first direction, between first holding portion 71*e*1 and second holding portion 71*e*2. Subsequently, the one end side of sampling unit 20 located on the one side in the first direction is butted against positioning portion 72*f* with the lower end and the upper end of sampling unit 20 respectively sliding on first holding portion 71*e*1 and second holding portion 71*e*2. Thus, sampling unit 20 is positioned and is also held by first holding portion 71*e*1 and second holding portion 71*e*2. Subsequently, second plate-shaped body 22 of sampling unit 20 is removably fixed to first base portion 71 with fastening member 22*g*.

Figure 6:
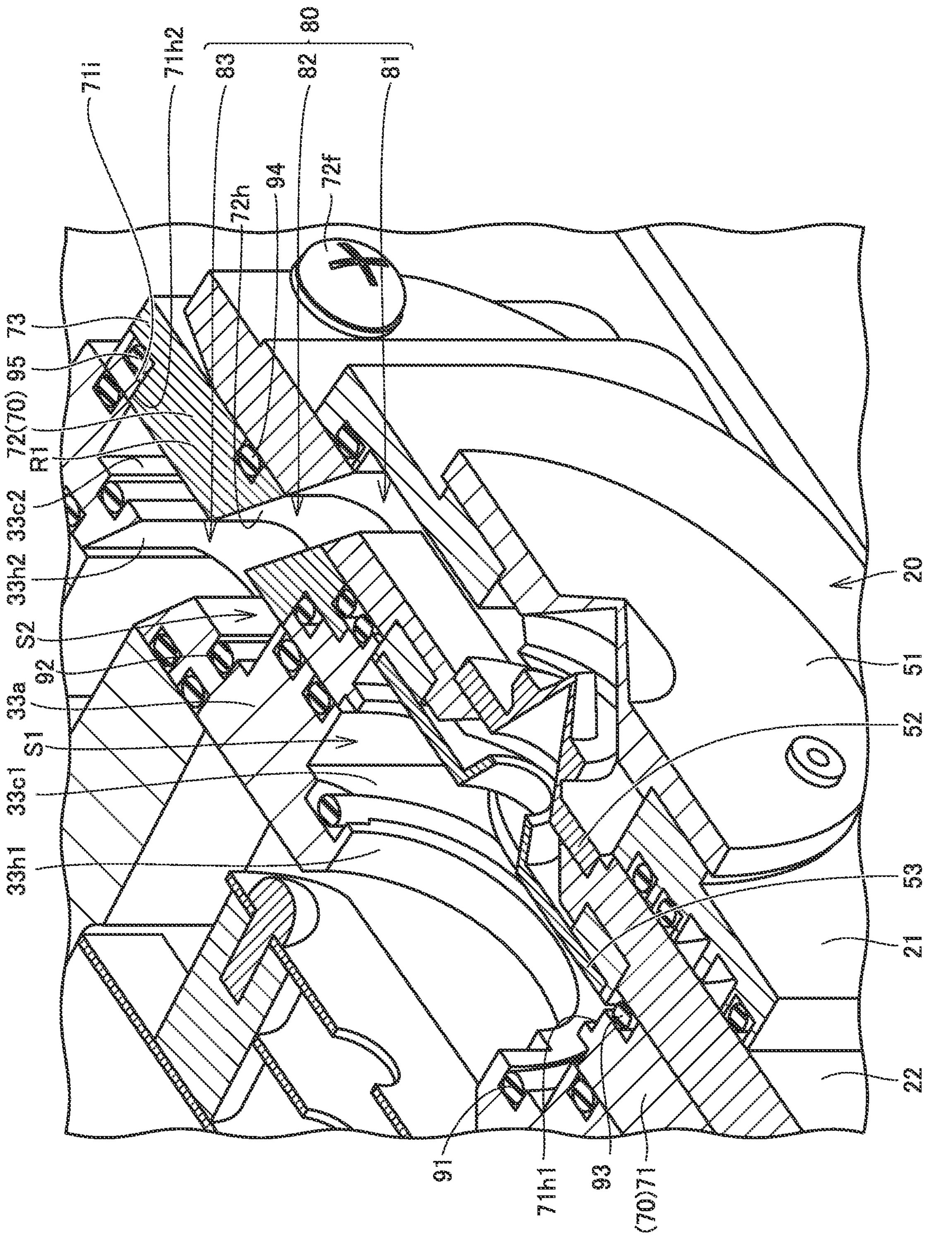
FIG. 6 is a sectional view taken along the line VI-VI shown in FIG. 2.

FIG. 6 is a sectional view taken along the line VI-VI shown in FIG. 2. As shown in FIG. 6, a first recess 33*c*1 and a second recess 33*c*2 are provided in wall 33*a* of housing 33.

First recess 33*c*1 is provided in a part of wall 33*a* which faces extractor electrode 53. First recess 33*c*1 is provided to be recessed in the thickness direction (direction AR3) of wall 33*a*. In first recess 33*c*1, an opening 33*h*1 for communication with the inside of housing 33 is provided. In first recess 33*c*1, a groove is provided in a portion located around opening 33*h*1. In the groove, a seal member 91 such as an O-ring is arranged.

As first recess 33*c*1 is provided, a clearance S1 is provided between wall 33*a* and first base portion 71. In clearance S1, a first shielding plate 611 (see FIG. 7) of first shutter 61 is arranged so as to ascend and descend. With first shielding plate 611 shielding opening 33*h*1, seal member 91 provides airtight sealing between the rear surface of first shielding plate 611 and first recess 33*c*1.

Second recess 33*c*2 is provided in a part of wall 33*a* which faces second base portion 72. Second recess 33*c*2 is provided to be recessed in the thickness direction of wall 33*a*. In second recess 33*c*2, an opening 33*h*2 for communication with second path 82 is provided. Opening 33*h*2 defines part of third path 83. In second recess 33*c*2, a groove is provided in a part located around opening 33*h*2. In the groove, a seal member 92 such as an O-ring is arranged.

As second recess 33*c*2 is provided, a clearance S2 is provided between wall 33*a* and second base portion 72. In clearance S2, a second shielding plate 621 (see FIG. 7) of second shutter 62 is arranged so as to ascend and descend. With second shielding plate 621 shielding opening 33*h*2, seal member 92 provides airtight sealing between the rear surface of second shielding plate 621 and second recess 33*c*2.

Also around opening 71*h*1 of first base portion 71, a groove is provided on the front surface side of first base portion 71, and a seal member 93 is arranged in the groove. Seal member 93 is sandwiched between first base portion 71 and second plate-shaped body 22. Thus, the inside of opening 71*h*1 is kept airtight.

Further, a step 71*i* is provided around opening 71*h*2 of first base portion 71, and a seal member 95 is also provided in step 71*i*. Seal member 95 is retained between step 71*i* and a flange 73 located around first part R1 of second base portion 72. On the front surface of second base portion 72, a seal member 94 is also arranged in a groove provided around opening 72*h*. Seal member 94 is retained between the rear surface of second plate-shaped body 22 and the front surface of second base portion 72. Thus, as seal members 94, 95 are provided, the inside of opening 72*h* is kept airtight.

Figure 7:
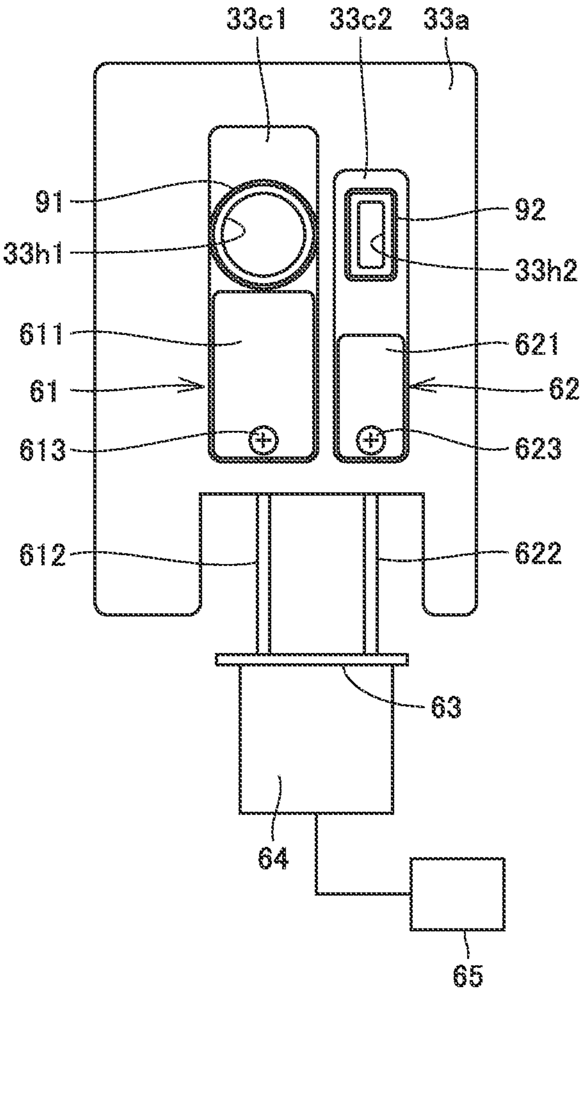
FIG. 7 shows a shutter mechanism provided in the mass spectrometer according to the embodiment, which is open.
Figure 8:
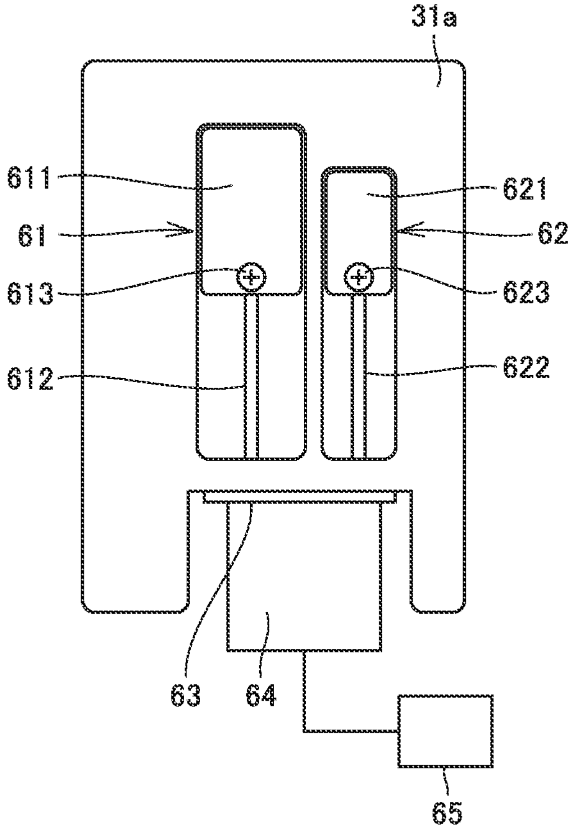
FIG. 8 shows the shutter mechanism provided in the mass spectrometer according to the embodiment, which is closed.

FIG. 7 shows a shutter mechanism provided in the mass spectrometer according to the embodiment, which is open. FIG. 8 shows the shutter mechanism provided in the mass spectrometer according to the embodiment, which is closed. Shutter mechanism 60 will be described in detail with reference to FIGS. 7 and 8.

As shown in FIGS. 7 and 8, shutter mechanism 60 includes first shutter 61, second shutter 62, a holding portion 63, a drive mechanism 64, and a controller 65.

First shutter 61 includes first shielding plate 611, a first attachment portion 612, and a fastening member 613. As described above, first shielding plate 611 is provided so as to ascend and descend within first recess 33*c*1. Thus, first shielding plate 611 can close opening 33*h*1 provided in housing 33 such that opening 33*h*1 can be open and closed.

First shielding plate 611 has a plate shape. The lower side of first shielding plate 611 is removably fastened to the upper portion of first attachment portion 612 with fastening member 613. First attachment portion 612 is provided in an approximately rod shape. First attachment portion 612 extends in the up-down direction. First attachment portion 612 is held by holding portion 63.

Second shutter 62 includes second shielding plate 621, a second attachment portion 622, and a fastening member (second fastening member) 623. As described above, second shielding plate 621 is provided so as to ascend and descend within second recess 33*c*2. As second shielding plate 621 ascends and descends, second shutter 62 switches between a communicated state in which second path 82 and third path 83 are in communication with each other and a blocked state in which they are blocked from each other.

More specifically, second shielding plate 621 is arranged between an opening end of second path 82 which is located on the third path 83 side and an opening end of third path 83 which is located on the second path 82 side. Second shielding plate 621 closes the opening end of second path 82 and the opening end of third path 83 for the blocked state and open the opening end of second path 82 and the opening end of third path 83 for the communicated state.

Second shielding plate 621 has a plate shape. The lower side of second shielding plate 621 is removably fastened to the upper portion of second attachment portion 622 with fastening member 623. Second attachment portion 622 is provided in an approximately rod shape. Second attachment portion 622 extends in the up-down direction. Second attachment portion 622 is held by holding portion 63.

Holding portion 63 holds first attachment portion 612 and second attachment portion 622. Holding portion 63 is caused to ascend and descend by drive mechanism 64. An operation of drive mechanism 64 is controlled by controller 65.

As holding portion 63 ascends and descends, first attachment portion 612 and second attachment portion 622 held by holding portion 63 ascend and descend, so that first shielding plate 611 and second shielding plate 621 respectively attached to first attachment portion 612 and second attachment portion 622 ascend and descend.

Although the present embodiment has described the case where first attachment portion 612 and second attachment portion 622 ascend and descend simultaneously by way of example, first attachment portion 612 and second attachment portion 622 may be provided so as to be held by different holding portions and individually ascend and descend.

Figure 9:
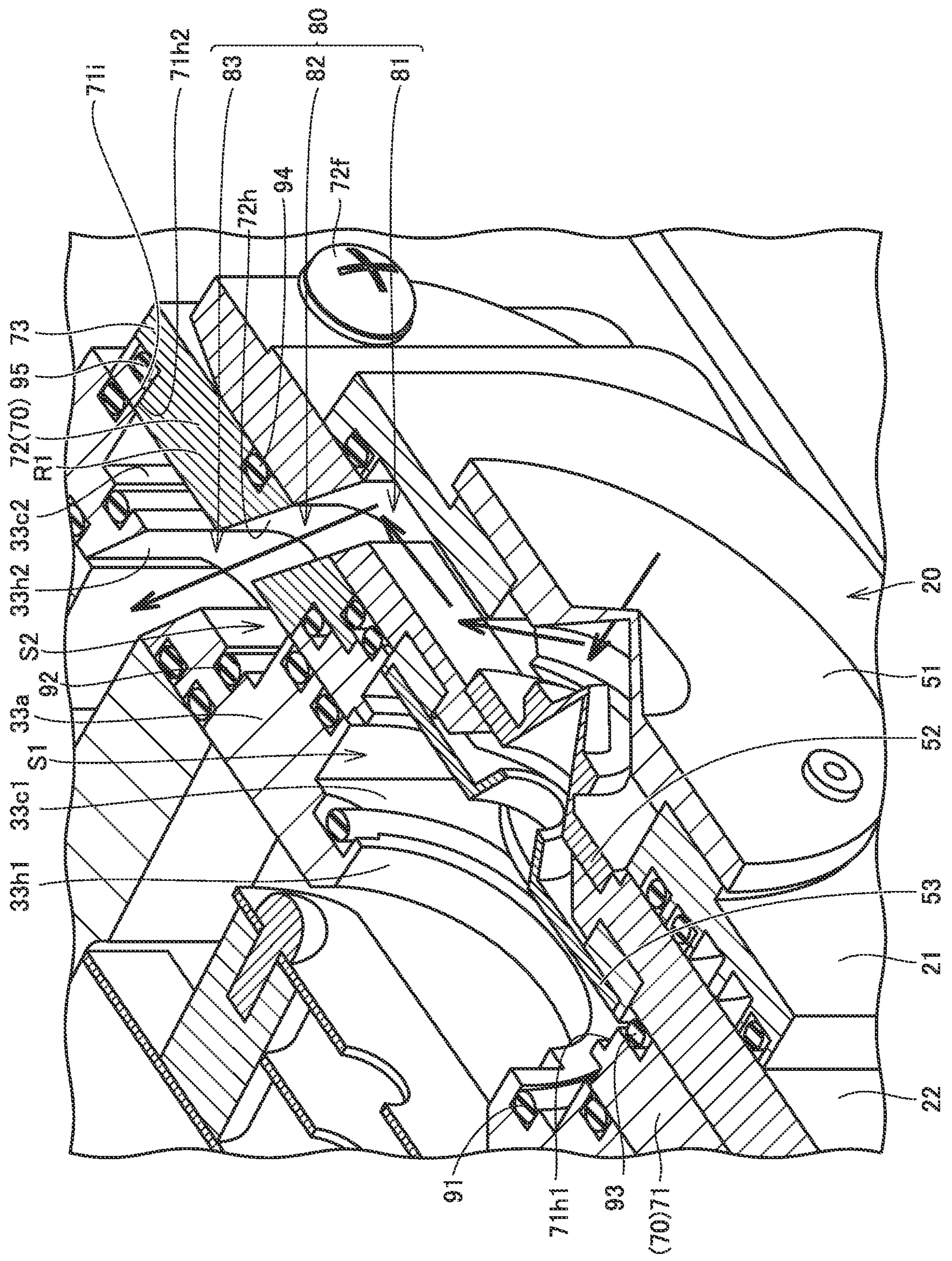
FIG. 9 shows how gas derived from a sample flows through an exhaust path according to the embodiment.

FIG. 9 shows how gas derived from a sample flows through an exhaust flow path according to the embodiment. As shown in FIG. 9, the gas derived from the sample is discharged through exhaust path 80, as indicated by the arrows.

Here, ammonium phosphate may be used as a mobile phase (solvent) when a sample is analyzed also with the use of a liquid chromatograph. In such a case, the gas derived from ammonium phosphate is generated as the gas derived from a sample in ionization of the sample. The gas derived from ammonium phosphate may deteriorate parts of exhaust path 80 due to its corrosiveness, or may be deposited as a sticky liquid substance in parts around exhaust path 80.

In particular, the liquid substance is easily deposited in clearance S2 provided between wall 33*a* and second base portion 72 and easily adheres to the rear surface side of second base portion 72. Also, second shielding plate 621 slides on the rear surface of second base portion 72. As a result, second shielding plate 621 also easily becomes dirty and corroded.

In addition, the liquid substance adheres to seal member 92 arranged around opening 33*h*2 and exposed to clearance S2. As the gas enters a gap between first base portion 71 and second base portion 72 from clearance S2 or enters a gap between second plate-shaped body 22 and second base portion 72, the liquid substance adheres to seal members 94, 95.

When seal members 92, 94, 95 are made of silicone rubber, the silicone rubber, which has a corrosion resistance to the gas, can suppress deterioration of seal members 92, 94, 95 due to the gas. On the other hand, seal members 92, 94, 95 are preferably cleaned or replaced in order to stably use mass spectrometer 1 for a long period of time.

As described above, second base portion 72 of second path 82 and parts around second base portion 72 are relatively easily affected by the gas.

In the present embodiment, sampling unit 20 and second base portion 72 are removed, enabling easy maintenance of the parts to which the liquid substance easily adheres.

Figure 10:
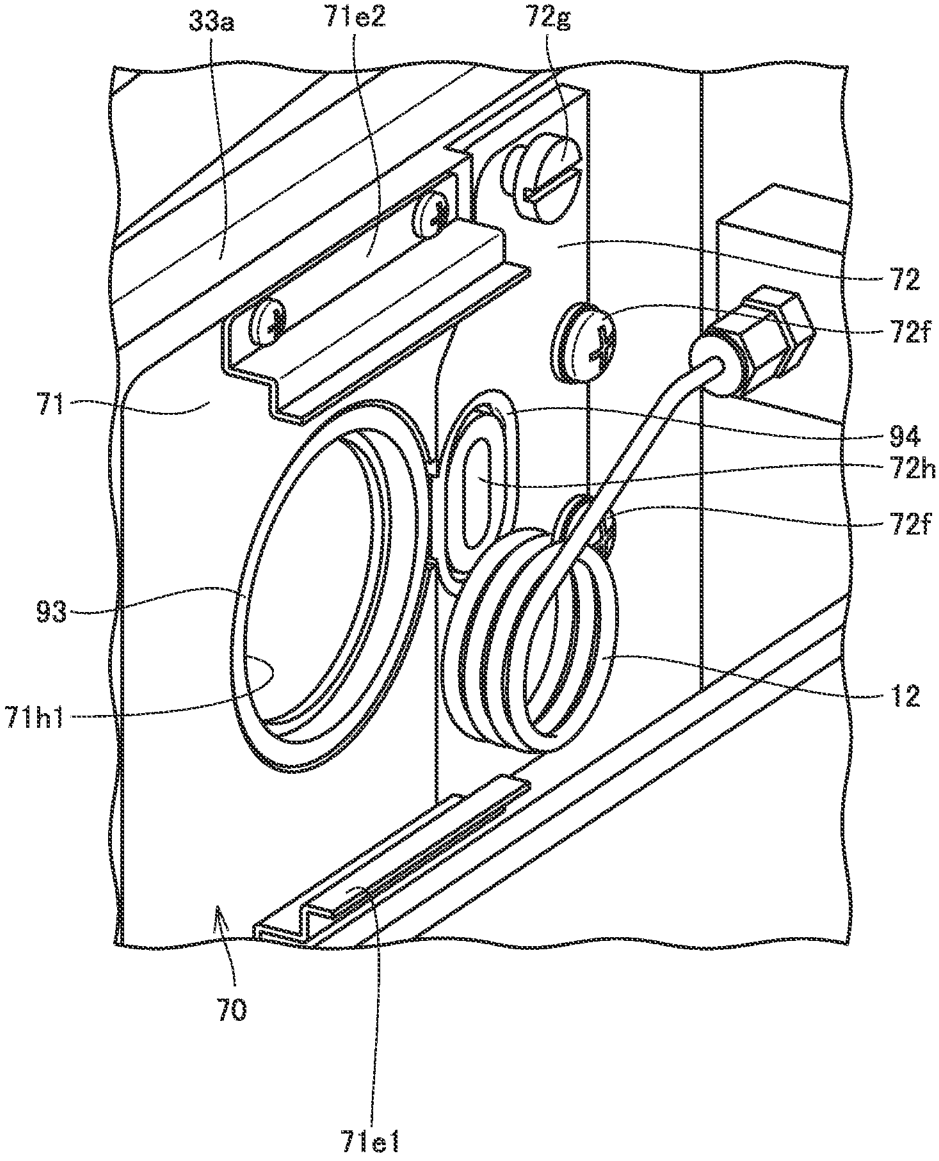
FIG. 10 is a perspective view showing a state in which the sampling unit is removed, according to the embodiment.
Figure 11:
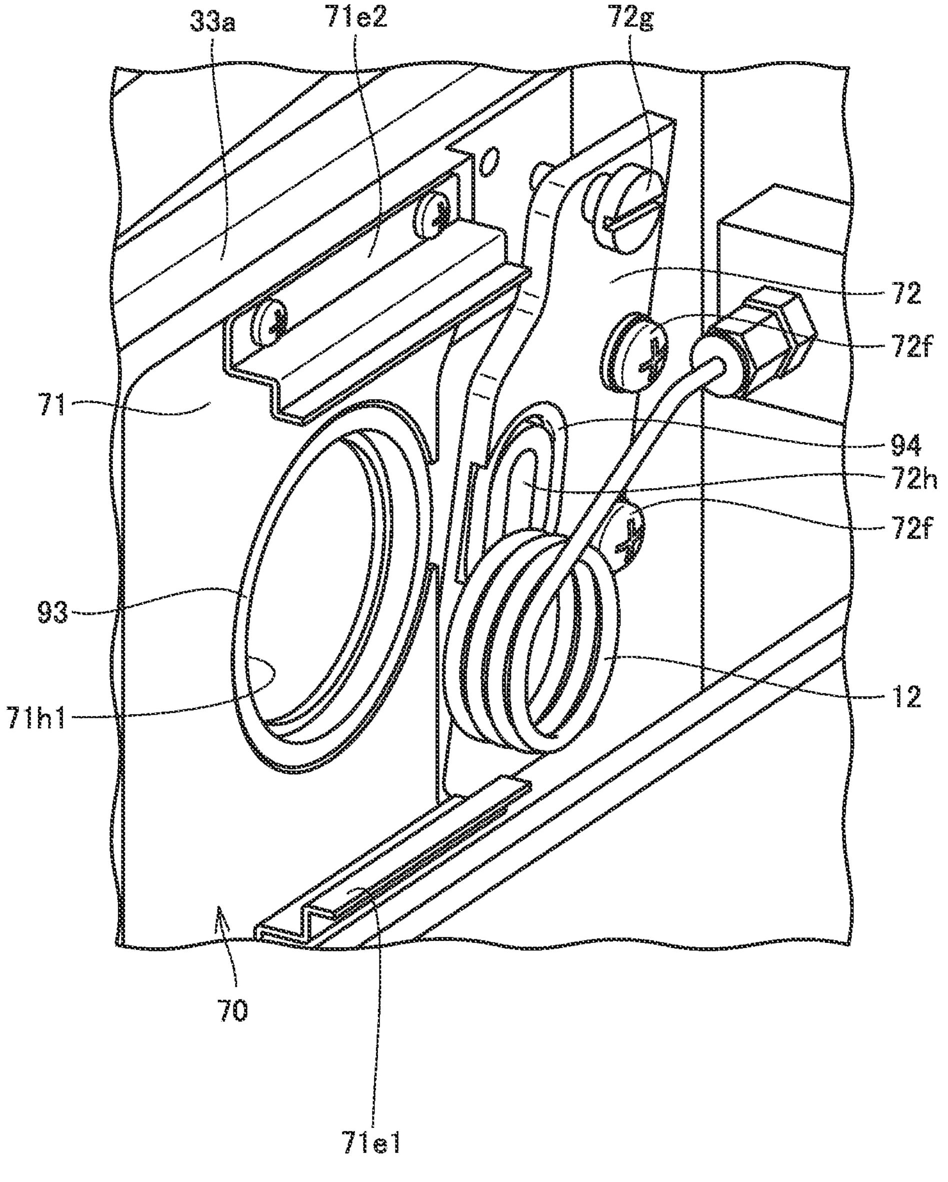
FIG. 11 is a perspective view showing how to remove a second base portion from the base portion, according to the embodiment.
Figure 12:
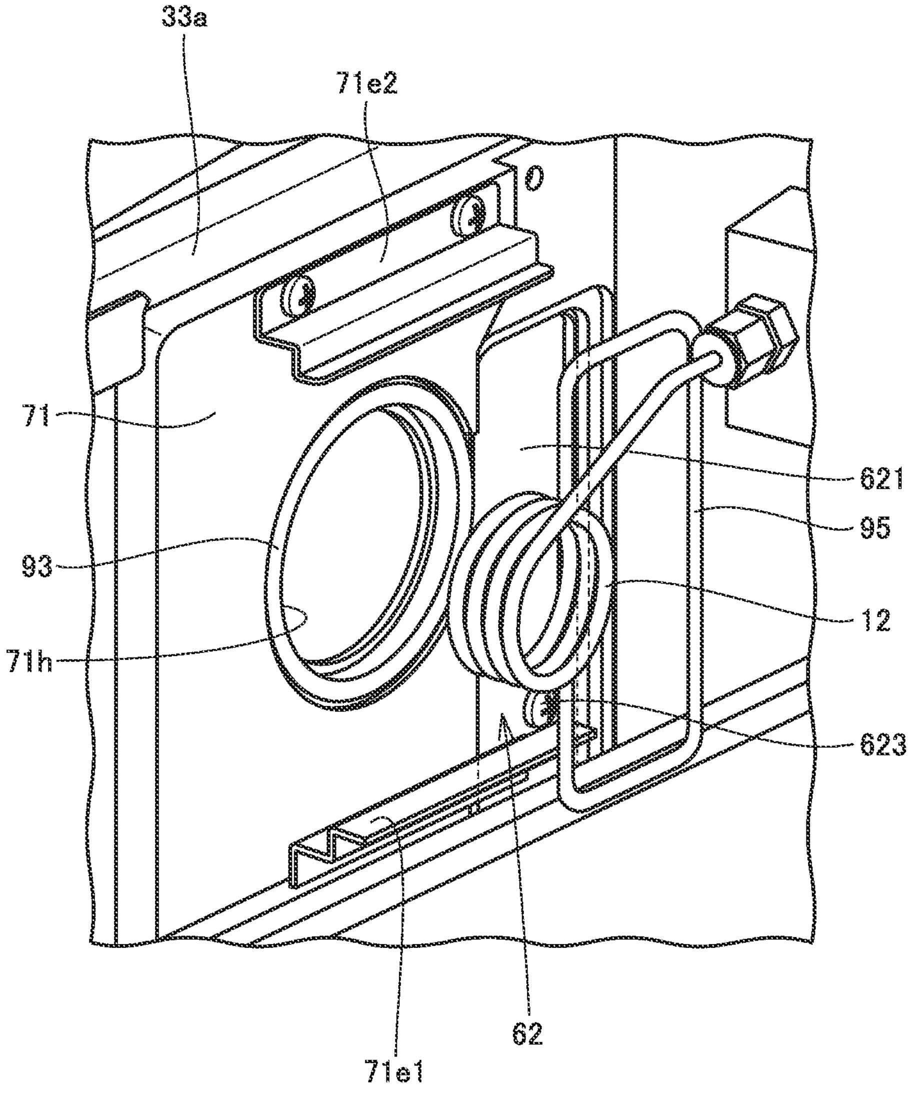
FIG. 12 is a perspective view showing a state in which the second base portion is removed from the base portion, according to the embodiment.

FIG. 10 is a perspective view showing a state in which the sampling unit is removed, according to the embodiment. FIG. 11 is a perspective view showing how the second base portion is removed from the base portion, according to the embodiment. FIG. 12 is a perspective view showing a state in which the second base portion is removed from the base portion, according to the embodiment. Maintenance of the parts described above will be described with reference to FIGS. 10 to 12.

For maintenance of the parts described above, first, sampling unit 20 is removed from base portion 70. In removal of sampling unit 20, fastening member 22*g* described above is removed from second plate-shaped body 22. Subsequently, sampling unit 20 is moved toward the other side in the second direction so as to slide on first holding portion 71*e*1 and second holding portion 71*e*2. As a result, sampling unit 20 can be removed. Sampling unit 20 removed can be disassembled and cleaned as appropriate. With sampling unit 20 removed, base portion 70 is exposed as shown in FIG. 10.

As shown in FIG. 11, then, second base portion 72 is removed. In removal of second base portion 72, fastening member 72*g* that fastens second base portion 72 and first base portion 71 to each other is loosened. Subsequently, second base portion 72 is tilted such that the upper side of second base portion 72 is away from wall 33*a*. In this state, second base portion 72 is lifted upward, and second base portion 72 is extracted from between first holding portion 71*e*1 and first base portion 71. From second base portion 72 extracted as described above, seal member 94 arranged around opening 72*h* can be extracted and cleaned or replaced with a new seal member. Also, the rear surface side of second base portion 72 to which the liquid substance easily adheres can be cleaned. This enables easy maintenance of second base portion 72 and seal member 94 that are easily affected by the gas.

As shown in FIG. 12, with second base portion 72 removed from first base portion 71, fastening member 623 of second shutter 62 is exposed externally. The state in which fastening member 623 is exposed externally may be a state in which second shutter 62 is closed or open.

With fastening member 623 exposed, second shielding plate 621 can be removed by loosening fastening member 623. Thus, second shielding plate 621 can be cleaned or replaced. Also, seal member 95 sandwiched between second base portion 72 and first base portion 71 can be removed, thus allowing cleaning or replacement of seal member 95. This enables easy maintenance of second shielding plate 621 and seal member 95 that are easily affected by the gas.

In the present embodiment, sampling unit 20 is removed from base portion 70, and then, second base portion 72 is removed from first base portion 71, enabling easy maintenance of parts of first path 81 and second path 82, which run from the sampling portion to housing 33 provided with mass spectrometry portion 30, of exhaust path 80, as described above.

Although the above embodiment has described the case where second base portion 22 is fixed to first base portion 71 with first holding portion 71*e*1 and fastening member 22*g* by way of example, second base portion 22 can be fixed with an appropriate means as long as it is removably fixed to first base portion 71.

Notes

[Configuration 1]

A mass spectrometer including:
- a housing having a wall and being provided with a mass spectrometry portion;
- a base portion provided on the wall;
- a sampling unit removably attached to the base portion, the sampling unit forming a sampling portion for introducing a sample ionized into the mass spectrometry portion; and
- an exhaust path for discharging gas derived from the sample not introduced from the sampling portion into the mass spectrometry portion, wherein
- the exhaust path includes
  - a first path provided in the sampling unit,
  - a second path provided in the base portion, the second path being in communication with the first path, and
  - a third path provided in the housing, the third path being in communication with the second path,
- the base portion has
  - a first base portion fixed to the wall, and
  - a second base portion with the second path provided therein, and the second base portion is removably fixed to the first base portion.

[Configuration 2]

The mass spectrometer according to configuration 1, wherein
- the first base portion and the second base portion are arranged side by side in a first direction as viewed from a direction perpendicular to the wall,
- the second base portion includes an overlap portion that partially overlaps the first base portion in the direction perpendicular to the wall,
- the first base portion is provided with a holding portion that holds an end side of the second base portion located on one side in a second direction orthogonal to the first direction, and
- at least a part of the overlap portion is removably fastened to the first base portion with a first fastening member.

[Configuration 3]

The mass spectrometer according to configuration 1 or 2, further comprising a seal member provided between the first base portion and the second base portion for airtight sealing between the first base portion and the second base portion, wherein the seal member is made of silicone rubber.

[Configuration 4]

The mass spectrometer according to any one of configurations 1 to 3, further including a shutter provided so as to block the second path and the third path from each other, wherein
- a clearance is formed between the second base portion and a part of the wall in which the third path is provided, and
- the shutter is arranged in the clearance.

[Configuration 5]

The mass spectrometer according to configuration 4, wherein the shutter includes a shielding plate, an attachment portion to which the shielding plate is attached, and a second fastening member that removably fastens the shielding plate to the attachment portion, and with the second base portion removed from the first base portion, the second fastening member is exposed externally.

The embodiment of the present invention is by way of illustration and example only and are not to be taken by way of limitation. The scope of the present invention is defined by the scope of the claims, and is intended to include any modifications within the scope and meaning equivalent to the scope of the claims.

REFERENCE SIGNS LIST

1 mass spectrometer; 10 plasma torch; 11 coolant gas tube; 12 high-frequency induction coil; 20 sampling unit; 21 first plate-shaped body; 22 second plate-shaped body; **22*g* fastening member; 30 mass spectrometry portion; 31 first chamber; 32 second chamber; 33 housing; 33*a* wall; 33*c*1 first recess; 33*c*2 second recess; 33*h*1, 33*h*2 opening; 34 ion lens; 35 housing; 36 mass separator; 37 detector; 38 vacuum pump; 38*b* high-vacuum exhaust path; 39 vacuum pump; 39*b* high-vacuum exhaust path; 41 refrigerant supply portion; 42 power supply; 43 gas supply; 51 sampling cone; 51*a* opening; 51*b* fastening member; 52 skimmer cone; 52*a* opening; 53 extractor electrode; 53*a* cylindrical portion; 60 shutter mechanism; 61 first shutter; 62 second shutter; 63 holding portion; 64 drive mechanism; 65 controller; 70 base portion; 71 first base portion; 71*a* main surface; 71*c* recess; 71*e*1 first holding portion; 71*e*2 second holding portion; 71*h*1, 71*h*2 opening; 71*i* step; 72 second base portion; 72*g* fastening member; 72*f* positioning portion; 72*h* opening; 73 flange; 80 exhaust path; 81 first path; 82 second path; 83 third path; 85 vacuum pump; 91, 92, 94, 95 seal member; 611 first shielding plate; 612 first attachment portion; 613 fastening member; 621 second shielding plate; 622 second attachment portion; 623** fastening member.

The invention claimed is:

1. A mass spectrometer comprising:

a housing having a wall and being provided with a mass spectrometry portion;

a base portion provided on the wall;

a sampling unit removably attached to the base portion, the sampling unit forming a sampling portion for introducing a sample ionized into the mass spectrometry portion; and an exhaust path for discharging gas derived from the sample not introduced from the sampling portion into the mass spectrometry portion, wherein the exhaust path includes a first path provided in the sampling unit, a second path provided in the base portion, the second path being in communication with the first path, and a third path provided in the housing, the third path being in communication with the second path, the base portion has a first base portion fixed to the wall, and a second base portion with the second path provided therein, and the second base portion is removably fixed to the first base portion.

2. The mass spectrometer according to claim 1, wherein the first base portion and the second base portion are arranged side by side in a first direction as viewed from a direction perpendicular to the wall, the second base portion includes an overlap portion that partially overlaps the first base portion in the direction perpendicular to the wall, the first base portion is provided with a holding portion that holds an end side of the second base portion located on one side in a second direction orthogonal to the first direction, and at least a part of the overlap portion is removably fastened to the first base portion with a first fastening member.

3. The mass spectrometer according to claim 1, further comprising a seal member provided between the first base portion and the second base portion for airtight sealing between the first base portion and the second base portion, wherein the seal member is made of silicone rubber.

4. The mass spectrometer according to claim 1, further comprising a shutter provided so as to switch between a state in which the second path and the third path are in communication with each other, and a state in which the second path and the third path are blocked from each other, wherein a clearance is formed between the second base portion and a part of the wall in which the third path is provided, and the shutter is arranged in the clearance.

5. The mass spectrometer according to claim 4, wherein the shutter includes a shielding plate, an attachment portion to which the shielding plate is attached, and a second fastening member that removably fastens the shielding plate to the attachment portion, and with the second base portion removed from the first base portion, the second fastening member is exposed externally.

* * * * *